(12) United States Patent
Shintani

(10) Patent No.: US 10,871,885 B2
(45) Date of Patent: Dec. 22, 2020

(54) INFORMATION PROCESSING APPARATUS

(71) Applicant: KYOCERA Document Solutions Inc., Osaka (JP)

(72) Inventor: Kazushi Shintani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 68 days.

(21) Appl. No.: 16/353,233

(22) Filed: Mar. 14, 2019

(65) Prior Publication Data

US 2019/0286306 A1    Sep. 19, 2019

(30) Foreign Application Priority Data

Mar. 19, 2018 (JP) .................... 2018-051719

(51) Int. Cl.
| | |
|---|---|
| G06F 3/0484 | (2013.01) |
| G06F 1/16 | (2006.01) |
| G06F 3/0346 | (2013.01) |
| G06F 3/0481 | (2013.01) |
| H04N 1/00 | (2006.01) |

(52) U.S. Cl.
CPC ........ G06F 3/04845 (2013.01); G06F 1/1626 (2013.01); G06F 1/1694 (2013.01); *G06F 3/0346* (2013.01); *G06F 3/04817* (2013.01); *G06F 2200/1637* (2013.01); *H04N 1/00442* (2013.01)

(58) Field of Classification Search
CPC .. G06F 1/1626; G06F 1/1694; G06F 3/04845; G06F 3/0482; G06F 3/0483; G06F 3/0485; G06F 3/0338; G06F 3/0346; G06F 2200/1637; G06F 3/04817; G06F 3/04892; H04N 1/00442
USPC .................. 345/158; 715/829, 838
See application file for complete search history.

(56) References Cited

U.S. PATENT DOCUMENTS

| | | | |
|---|---|---|---|
| 2007/0160345 A1* | 7/2007 | Sakai | G06F 3/0482 386/230 |
| 2013/0038637 A1* | 2/2013 | Yamanaka | G06F 3/0485 345/684 |
| 2013/0106809 A1* | 5/2013 | Ohsaki | G06F 3/0346 345/204 |

(Continued)

FOREIGN PATENT DOCUMENTS

JP    2005-165760 A    6/2005

*Primary Examiner* — Jimmy H Nguyen
(74) *Attorney, Agent, or Firm* — IP Business Solutions, LLC

(57) ABSTRACT

An information processing apparatus includes a display unit, a storage unit, and a control unit. The storage unit contains a plurality of content images to be displayed in a predetermined display order, and a plurality of sample images respectively corresponding to the plurality of content images. The control unit (i) acquires the content image from the storage unit and causes the display unit to display the content image on the screen, and (ii) acquires from the storage unit, upon deciding that a user has instructed to display the sample image, a predetermined number of sample images respectively corresponding to a predetermined number of content images subsequent in the display order to the content image currently displayed on the screen, and causes the display unit to display the sample images on a part of the screen.

9 Claims, 17 Drawing Sheets

(56) References Cited

U.S. PATENT DOCUMENTS

2015/0082249 A1* 3/2015 Kim .................. G11B 27/326
                                                    715/838

* cited by examiner

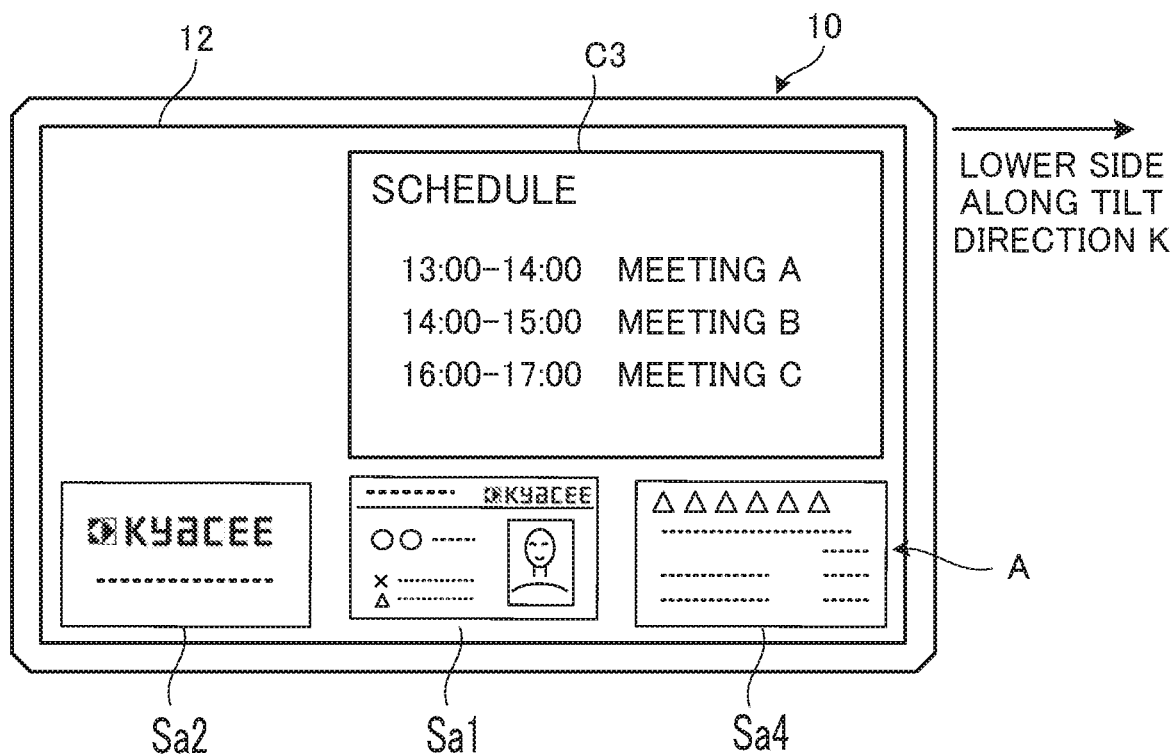

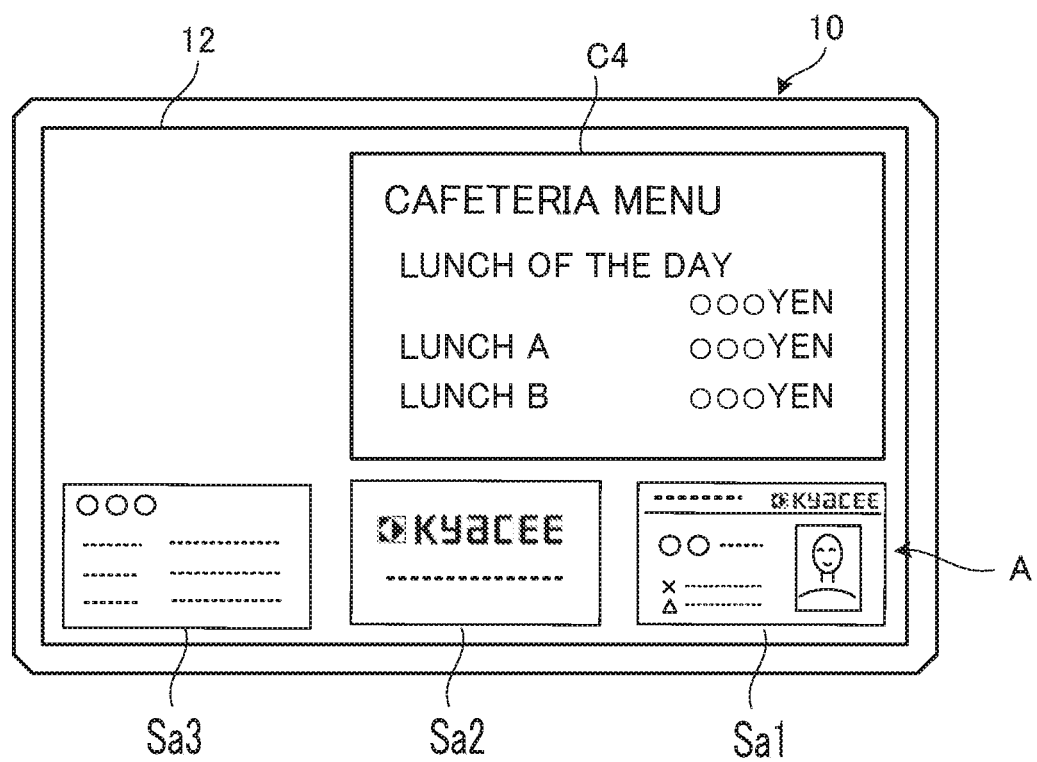

INFORMATION PROCESSING APPARATUS

INCORPORATION BY REFERENCE

This application claims priority to Japanese Patent Application No. 2018-051719 filed on Mar. 19, 2018, the entire contents of which are incorporated by reference herein.

BACKGROUND

The present disclosure relates to a portable information processing apparatus with a display unit, and more particularly to a technique to switch display contents on the display unit.

Techniques thus far developed, in relation to a display system for displaying a content, include utilizing a tilt sensor in a mobile phone terminal, to switch the display content on a display unit of an electronic paper, depending on the extent of the tilt. With such a display system, for example, when a tilt angle detected by the tilt sensor exceeds a predetermined level, a right-hand page is displayed when the display unit is tilted to the right, a left-hand page is displayed when the display unit is tilted to the left, a page a specified number of pages ahead is displayed when the display unit is tilted forward, and a page a specified number of pages behind is displayed when the display unit is tilted backward.

SUMMARY

The disclosure proposes further improvement of the foregoing technique.

In an aspect, the disclosure provides an information processing apparatus including a display unit, a storage unit, and a control unit. The storage unit contains a plurality of content images to be displayed on a screen of the display unit in a predetermined display order, and a plurality of sample images respectively corresponding to the plurality of content images, and smaller in size than the content images. The control unit includes a processor, and acts as an instruction identifier and a controller, when the processor executes a control program. The instruction identifier identifies, when a user operates the display unit, a type of an instruction corresponding to the operation. The controller (i) acquires the content image from the storage unit and causes the display unit to display the content image on the screen, and (ii) acquires from the storage unit, when the instruction identifier decides that an instruction to display the sample image has been made, a predetermined number of sample images respectively corresponding to a predetermined number of content images subsequent in the display order to the content image currently displayed on the screen, and causes the display unit to display the sample images on a part of the screen.

BRIEF DESCRIPTION OF THE DRAWINGS

FIG. 7A to FIG. 7G are plan views sequentially showing the screen of the display unit, in which the content image and a predetermined number of sample images are displayed by turns.

DETAILED DESCRIPTION

Hereafter, an embodiment of the disclosure will be described, with reference to the drawings.

Figure 1:
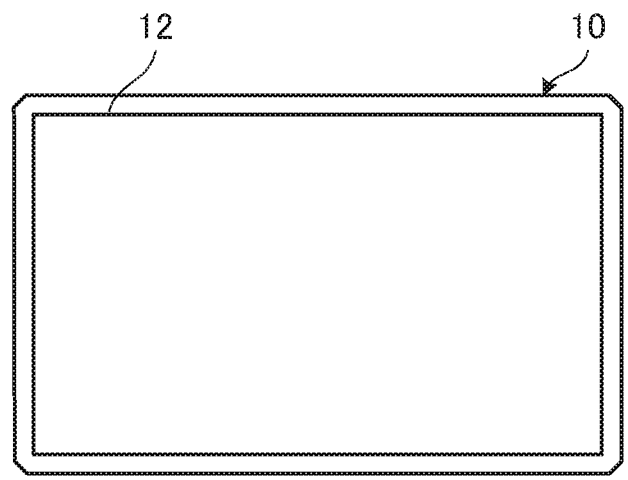
FIG. 1 is a plan view showing an appearance of an information processing apparatus according to an embodiment of the disclosure.
Figure 2:
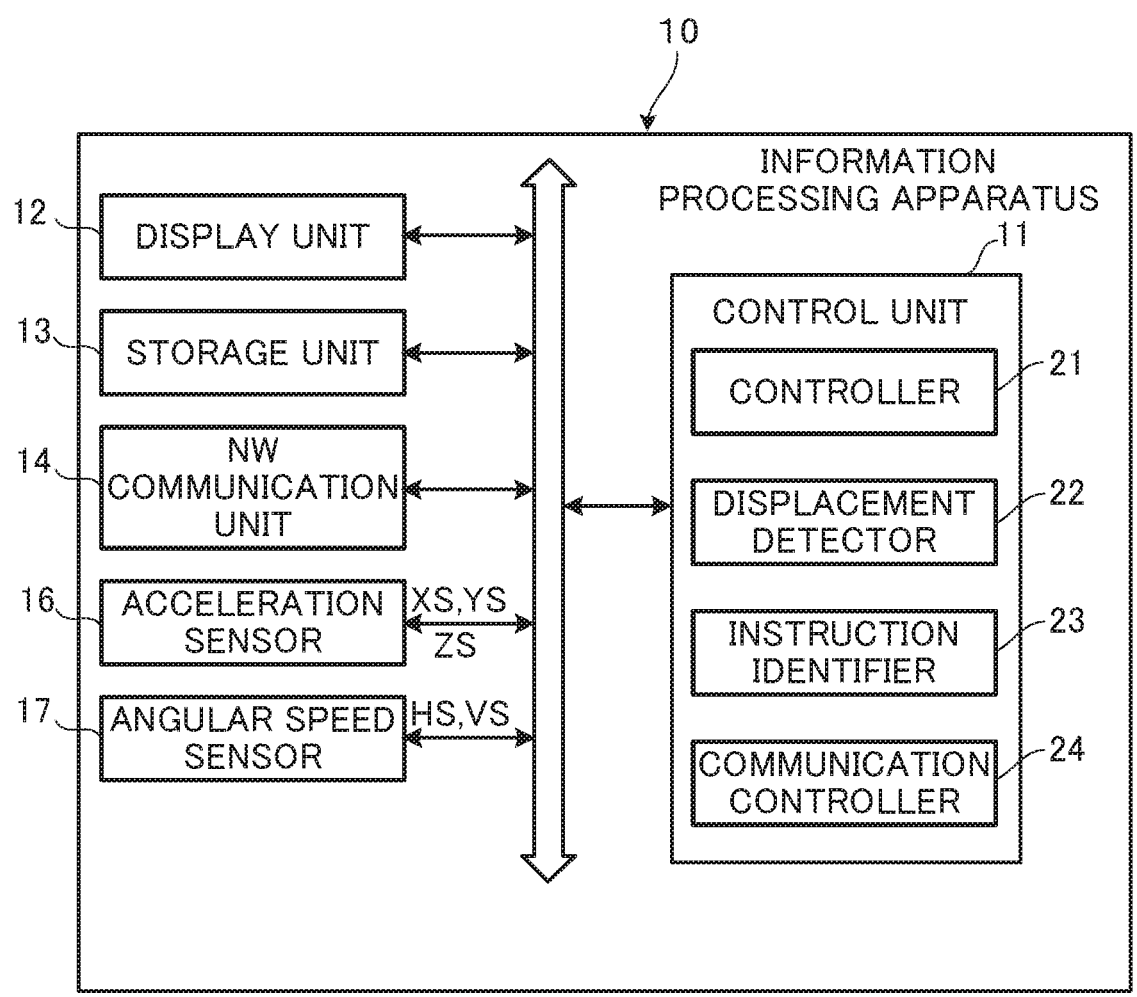
FIG. 2 is a block diagram showing an internal configuration of the information processing apparatus according to the embodiment.

FIG. 1 is a plan view showing an appearance of an information processing apparatus according to the embodiment of the disclosure. FIG. 2 is a block diagram showing an internal configuration of the information processing apparatus according to the embodiment.

The information processing apparatus 10 according to this embodiment is an identification (ID) card, for example a staff ID, and includes a control unit 11, a display unit 12, a storage unit 13, a network (NW) communication unit 14, an acceleration sensor 16, and an angular speed sensor 17. The mentioned elements are configured to transmit and receive data or signals to and from each other, via a bus.

The display unit 12 includes, for example, a liquid crystal display (LCD), an organic light-emitting diode (OLED), or an electronic paper.

The storage unit 13 is, for example, electrically erasable programmable read-only memory (EEPROM) having a large capacity, and contains a plurality of content images to be displayed on the display unit 12, and a plurality of sample images respectively corresponding to the plurality of content images, and smaller in size than the content images. Here, the content image refers to an image representing a content provided by, for example, a site on the World Wide Web.

The controller 21 may be configured to generate the sample image from the content image representing the content, with its image processing function, and causes the display unit 12 to display the sample image thus generated. The following description refers, however, to the case where the controller 21 causes the display unit 12 to display the sample image stored in the storage unit 13.

The NW communication unit 14 is a communication interface including a communication module such as a non-illustrated local area network (LAN) chip. The NW communication unit 14 is connected to a server via a network such as a public telephone network, to perform data communication with the server. For example, the content transmitted from the server is received by the NW communication unit 14, and stored in the storage unit 13.

The acceleration sensor 16, which is a known tri-axis acceleration sensor, detects acceleration in three directions, namely along an X-axis, a Y-axis, and a Z-axis of the screen of the display unit 12 of the information processing apparatus 10, and outputs detection signals XS, YS, and ZS respectively indicating the acceleration in the three directions. Because of being incorporated in the information processing apparatus 10, the acceleration sensor 16 detects the acceleration in the three directions exerted on the information processing apparatus 10.

The angular speed sensor 17, which is a known angular speed sensor, detects the rotation speed of the information processing apparatus 10 about the Y-axis. In this embodiment, a pair of angular speed sensors 17 are provided. One of the angular speed sensors 17 detects the rotation of the screen of the display unit 12 about the Y-axis, and outputs a detection signal HS indicating the rotation angle. The other angular speed sensor 17 detects the rotation of the screen of the display unit 12 about the X-axis, and outputs a detection signal VS indicating the rotation angle.

The control unit 11 includes a processor, a random-access memory (RAM), a read-only memory (ROM), and so forth. The processor is, for example, a central processing unit (CPU), a micro-processing unit (MPU), an application specific integrated circuit (ASIC), or the like. The control unit 11 acts, when the processor executes a control program stored in the ROM or the storage unit 13, as the controller 21, a displacement detector 22, an instruction identifier 23, and a communication controller 24. Here, the components of the control unit 11 cited above may each be constituted in the form of a hardware circuit, instead of being performed according to the program.

The controller 21 serves to control the overall operation including, as a primary task, controlling of the displaying operation of the display unit 12. The communication controller 24 controls the communicating operation of the NW communication unit 14.

The displacement detector 22 detects, upon receipt of the detection signals XS, YS, and ZS outputted from the acceleration sensor 16, and the detection signals HS and VS outputted from the respective angular speed sensors 17, the displacement direction and other data of the information processing apparatus 10, on the basis of the detection signal.

Figure 3:
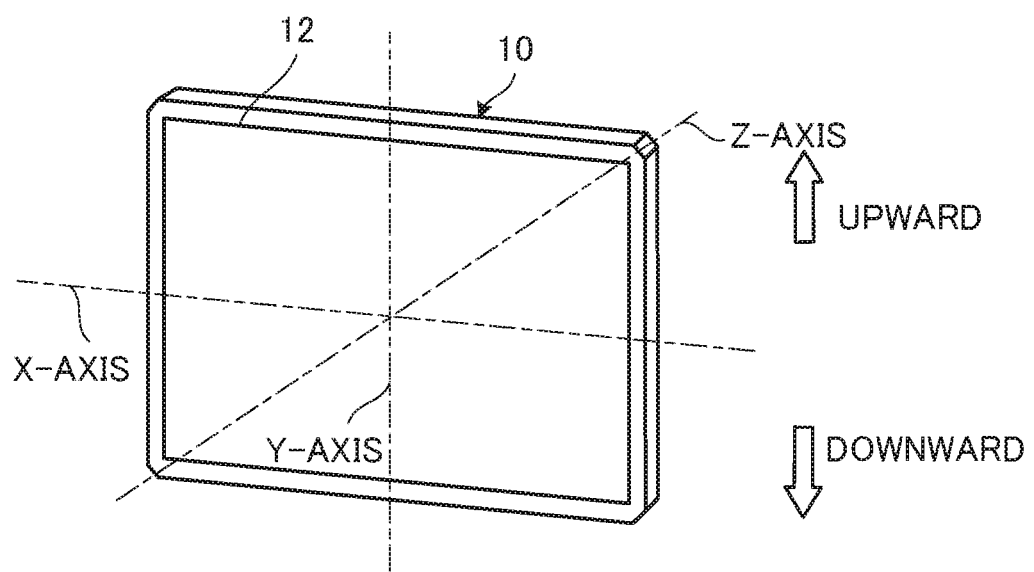
FIG. 3 is a perspective view showing the upward and downward direction of the display unit of the information processing apparatus.

For example, the displacement detector 22 detects, when the detection signal YS outputted from the acceleration sensor 16 is either higher than a predetermined threshold S or lower than a threshold −S, an upward or downward displacement of the information processing apparatus 10, as shown in FIG. 3.

Figure 4:
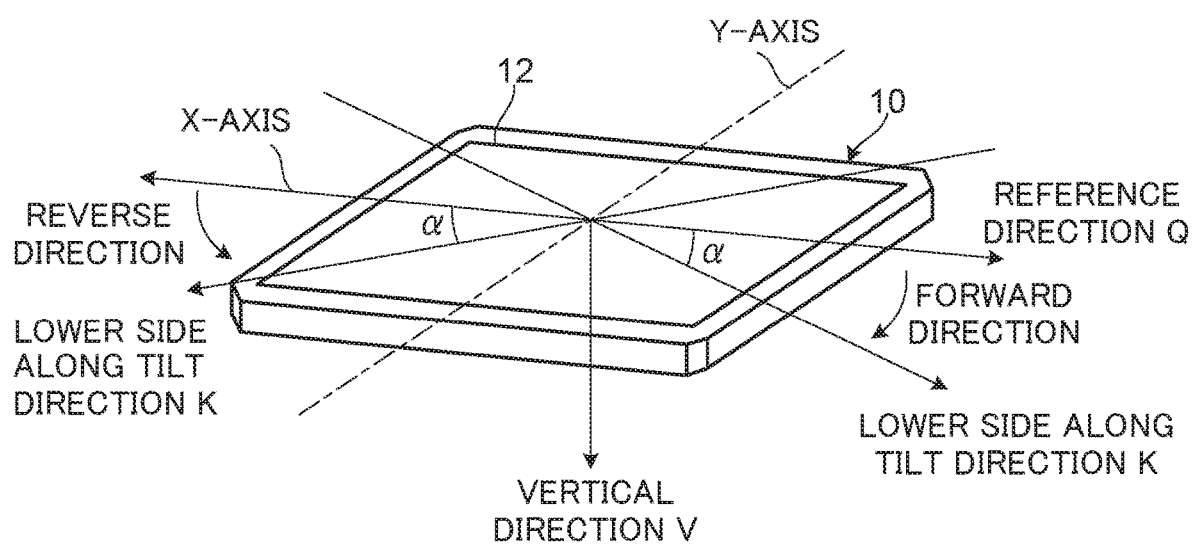
FIG. 4 is a perspective view of the information processing apparatus, for explaining the tilt direction and the tilt angle of the screen of the display unit.

The displacement detector 22 detects gravity acceleration on the basis of the detection signals XS, YS, and ZS outputted from the acceleration sensor 16, to acquire the direction of the gravity acceleration (vertical direction) V as shown in FIG. 4, and detects the direction of the X-axis of the screen of the display unit 12 with respect to the vertical direction V, as a reference direction Q. When the user tilts the screen of the display unit 12 about the Y-axis thereof as shown in FIG. 4, the displacement detector 22 detects a tilt direction K and a tilt angle α of the screen of the display unit 12 about the Y-axis, with respect to the as shown in FIG. 4, on the basis of the detection signal HS from the angular speed sensor 17. Further, the displacement detector 22 detects the tilt direction K and the tilt angle α of the rotation about the Y-axis, both in a forward direction and in a reverse direction.

Here, it is also possible to detect the tilt direction K and the tilt angle α of the screen of the display unit 12, on the basis of the detection signals XS, YS, and ZS outputted from the acceleration sensor 16. Alternatively, a pendulum type or a float switch type tilt sensor may be employed in place of the acceleration sensor 16, to detect the direction of the screen of the display unit 12.

The instruction identifier 23 identifies the type of the instruction made about the display of the content image and the sample image on the screen of the display unit 12, on the basis of the upward and downward displacement of the information processing apparatus 10 detected by the displacement detector 22, and the tilt direction K and the tilt angle α of the screen of the display unit 12 about the Y-axis.

The controller 21 controls the display of the content image and the sample image on the screen of the display unit 12, on the basis of the instruction identified by the instruction identifier 23.

Hereunder, the control of controls the display of the content image and the sample image on the screen of the display unit 12, based on the upward and downward displacement of the information processing apparatus 10, and the tilt direction K and the tilt angle α of the screen of the display unit 12 about the Y-axis, will be described in detail.

Figure 5:
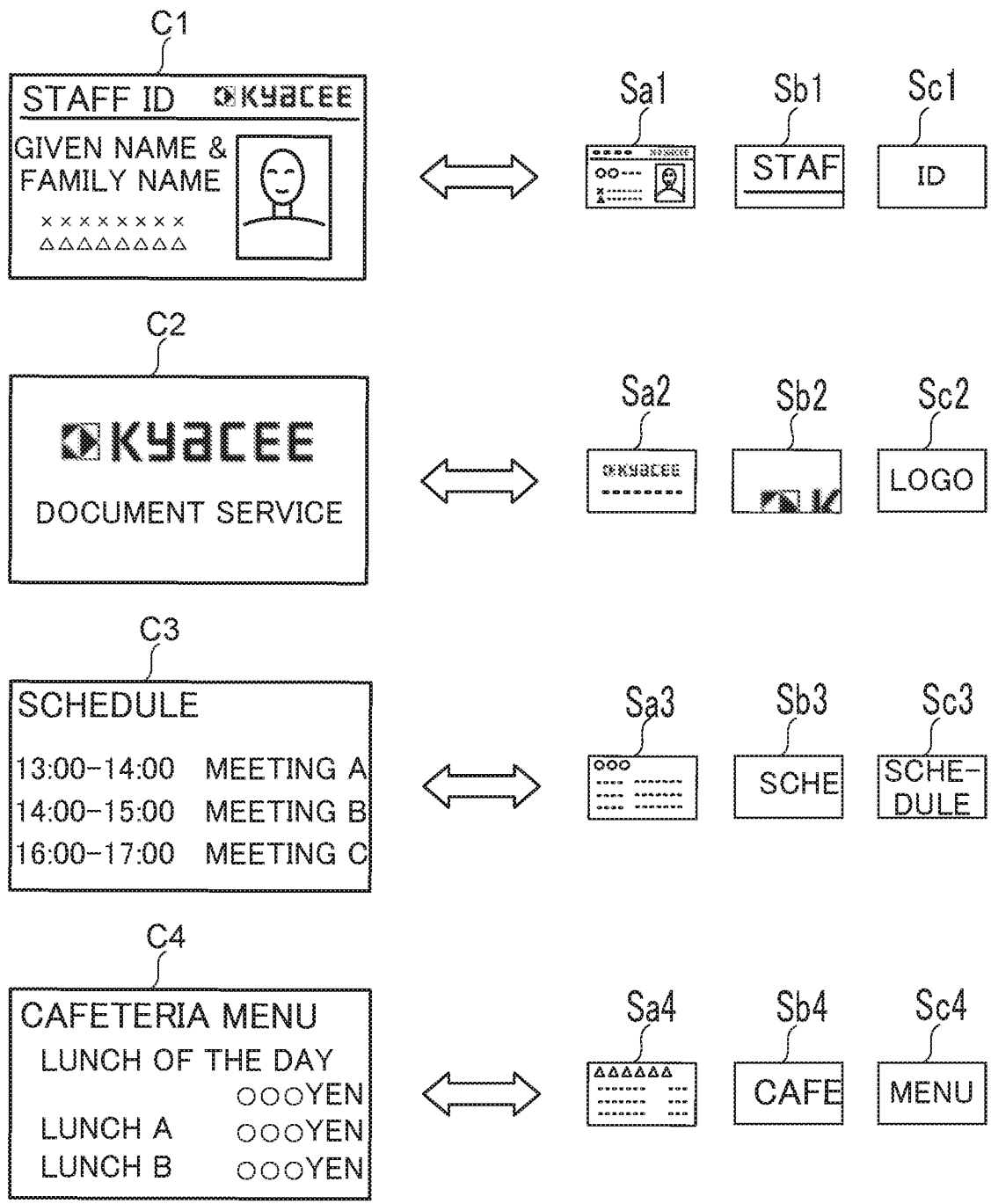
FIG. 5 is a schematic drawing showing correspondences between content images and sample images displayed on the display unit.

FIG. 5 illustrates a plurality of content images C1 to C4 stored in the storage unit 13, and sample images Sa1 to Sa4 respectively corresponding to the content images C1 to C4. The sample images Sa1 to Sa4 are reduced images (thumbnails) of the respective content images C1 to C4. With respect to the content images C1 to C4 and the sample images Sa1 to Sa4, a display order, according to which the images are to be displayed on the display unit 12, is specified in advance. The display orders of the content images C1 to C4 and the sample images Sa1 to Sa4 are cyclically specified, so that transition from the last display order to the first display order, and transition from the first display order to the display order, are both possible.

Figure 6:
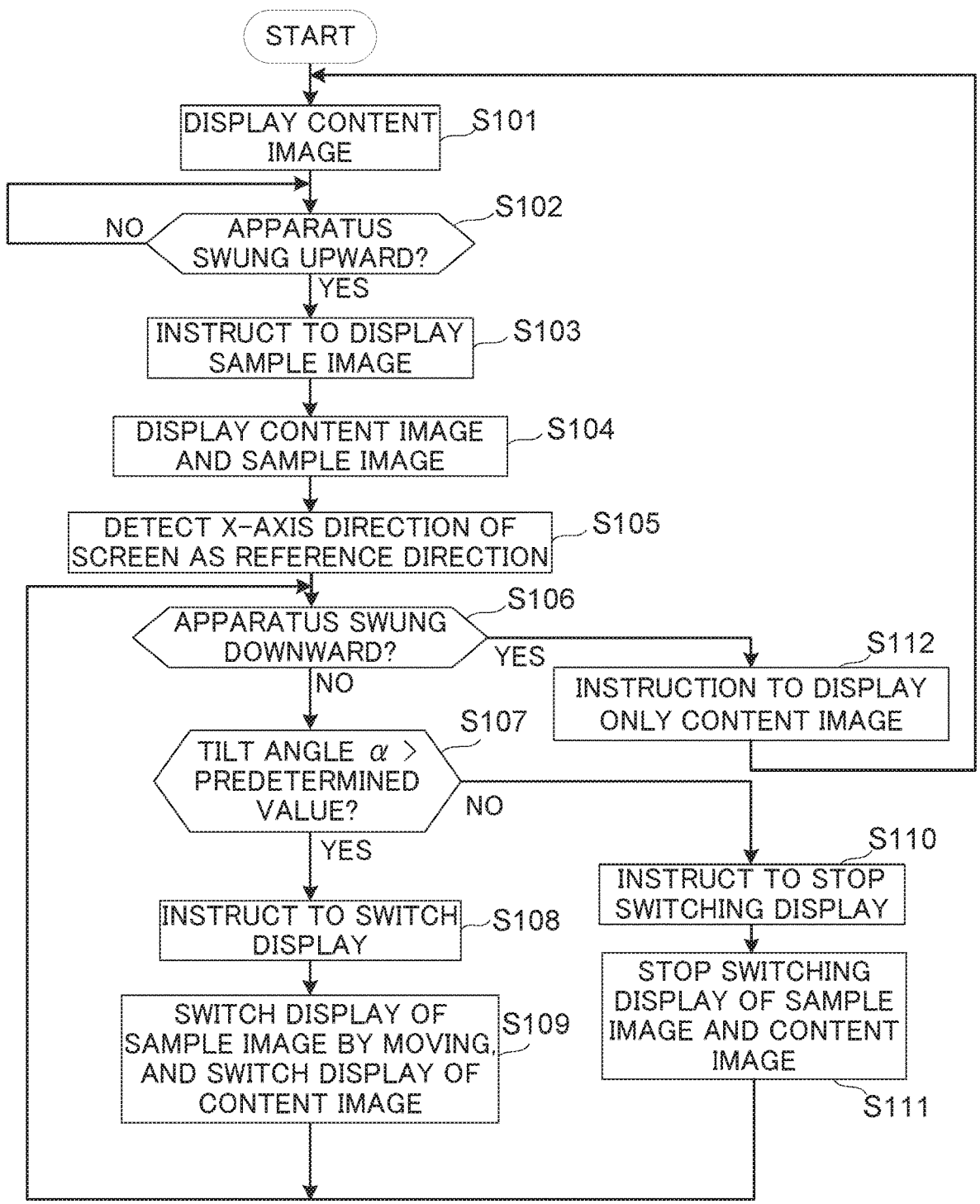
FIG. 6 is a flowchart showing a switching process of the content images and a predetermined number of sample images displayed on the display unit.

FIG. 6 is a flowchart showing a display control process of the content images and the sample images displayed on the screen of the display unit display unit 12.

Figure 7A:
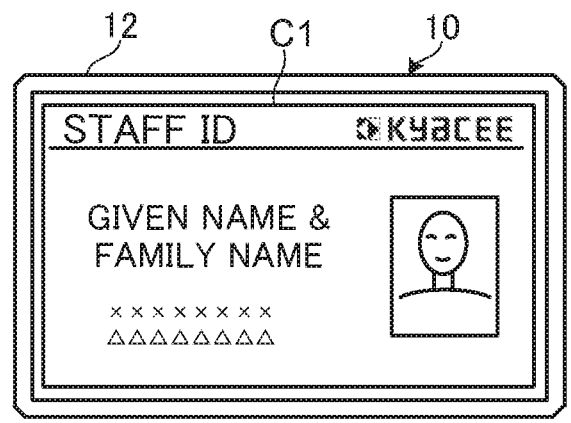

First, when the content image C1 is displayed on the screen of the display unit 12 as shown in FIG. 7A (step S101), the displacement detector 22 stands by for an upward displacement of the information processing apparatus 10 (No at step S102). When the user swings the information processing apparatus 10 upward in this state, the displacement detector 22 detects the upward displacement of the information processing apparatus 10 (Yes at step S102). When the displacement detector 22 thus detects the upward displacement, the instruction identifier 23 decides that the user has made an instruction to display the sample image, on the basis of the upward displacement (step S103).

Figure 7B:
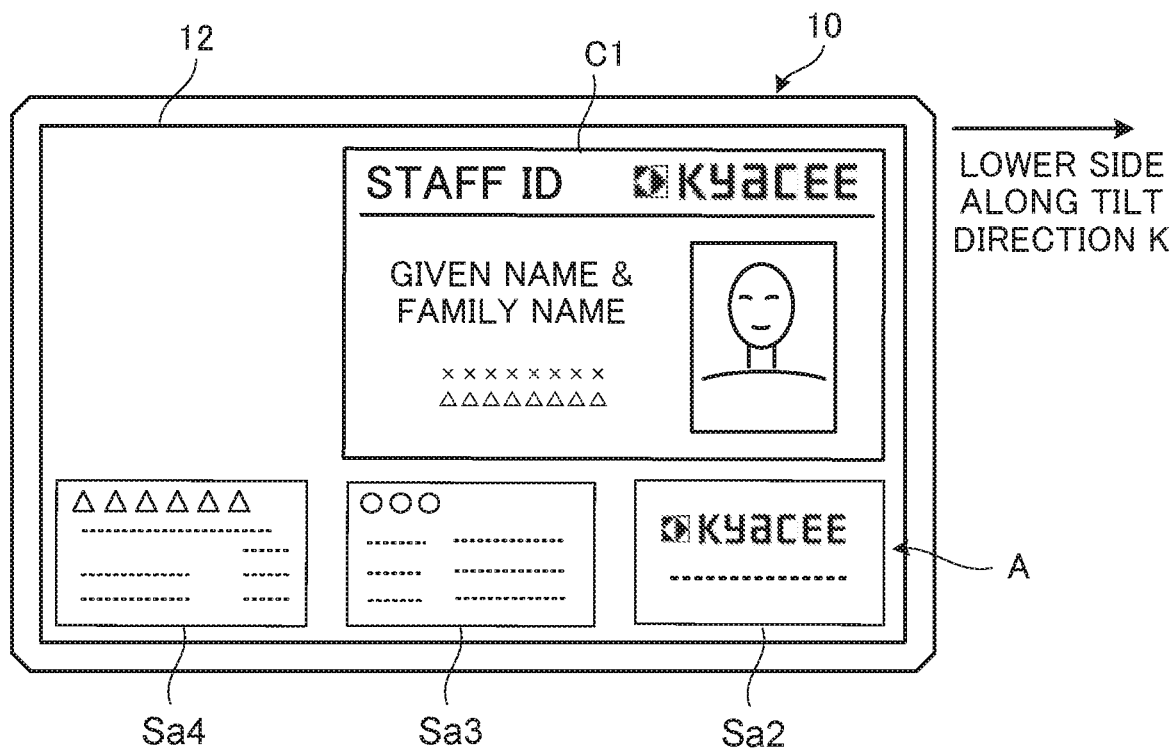

When it is decided that the instruction to display the sample image has been made, the controller 21 generates, according to the instruction, a reduced image of the content image C1 and displays the entirety of the reduced content image C1 on the upper side of the screen of the display unit 12 as shown in FIG. 7B. In addition, the controller 21 reads out, from the storage unit 13, the sample images Sat, Sa3, and Sa4, respectively corresponding to a predetermined number of content images C2, C3, and C4 subsequent to the content image C1 in the display order, and causes the display unit 12 to display the sample images in a region A in the screen where the reduced content image C1 is not displayed, in this embodiment the region A on the lower side of the reduced content image C1 (step S104).

The displacement detector 22 also detects the direction of the X-axis of the screen of the display unit 12 with respect to the vertical direction V, as the reference direction Q, immediately after detecting the upward displacement of the information processing apparatus 10 (step S105).

When the content image C1 and the sample images Sat, Sa3, and Sa4 are displayed on the screen of the display unit 12, and the X-axis of the screen of the display unit 12 with respect to the vertical direction V is detected as the reference direction Q as described above, the displacement detector 22 detects the tilt direction K and the tilt angle α of the screen of the display unit 12 with respect to the reference direction Q, about the Y-axis in the forward or reverse direction, on the basis of the detection signal HS from the angular speed sensor 17. The instruction identifier 23 then stands by for the detection of the downward displacement of the information processing apparatus 10 by the displacement detector 22 (step S106), or until the tilt angle α of the screen of the display unit 12 about the Y-axis in the forward or reverse direction, detected by the displacement detector 22, exceeds a predetermined value (e.g., 10 degrees) (step S107).

In this state, for example when the user tilts the information processing apparatus 10 about the Y-axis of the screen of the display unit 12 in the forward direction, such that the tilt angle α of the screen of the display unit 12 about the Y-axis exceeds the predetermined value (No at step S106, Yes at step S107), the instruction identifier 23 decides that the user has instructed to switch the display of the content image and the sample images, on the basis of the fact that the tilt angle α has exceeded the predetermined value (step S108).

Figure 7C:
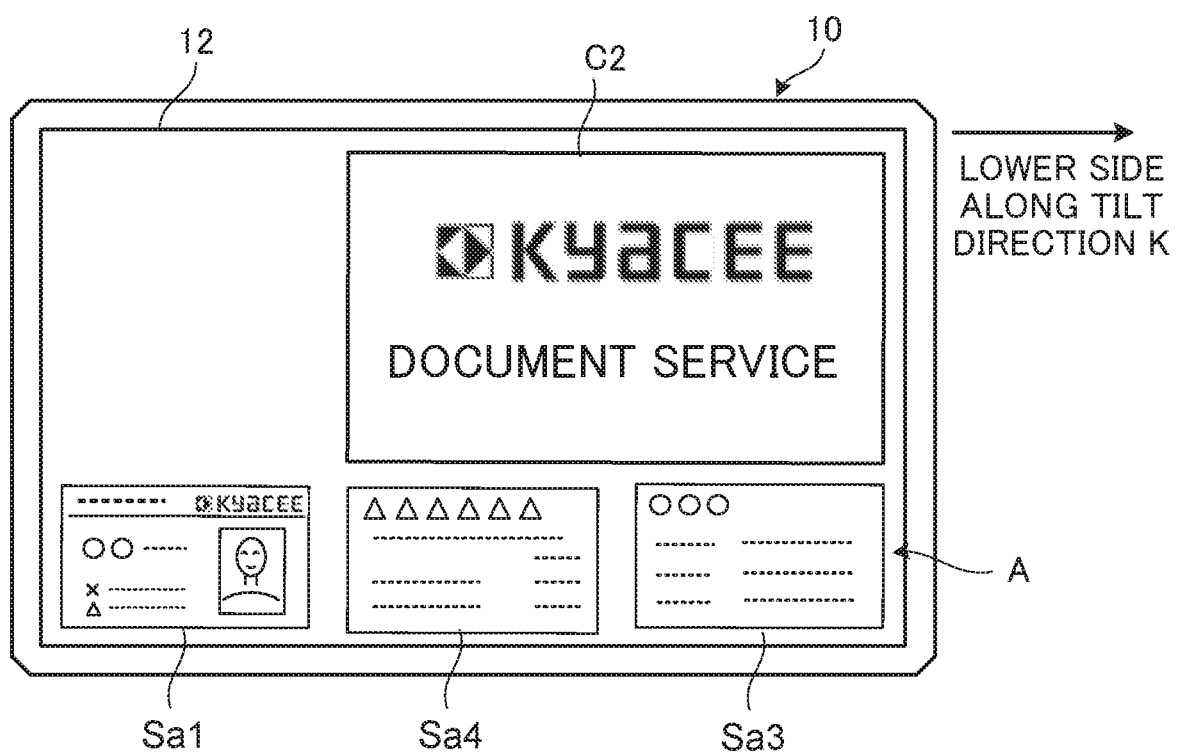
Figure 7F:
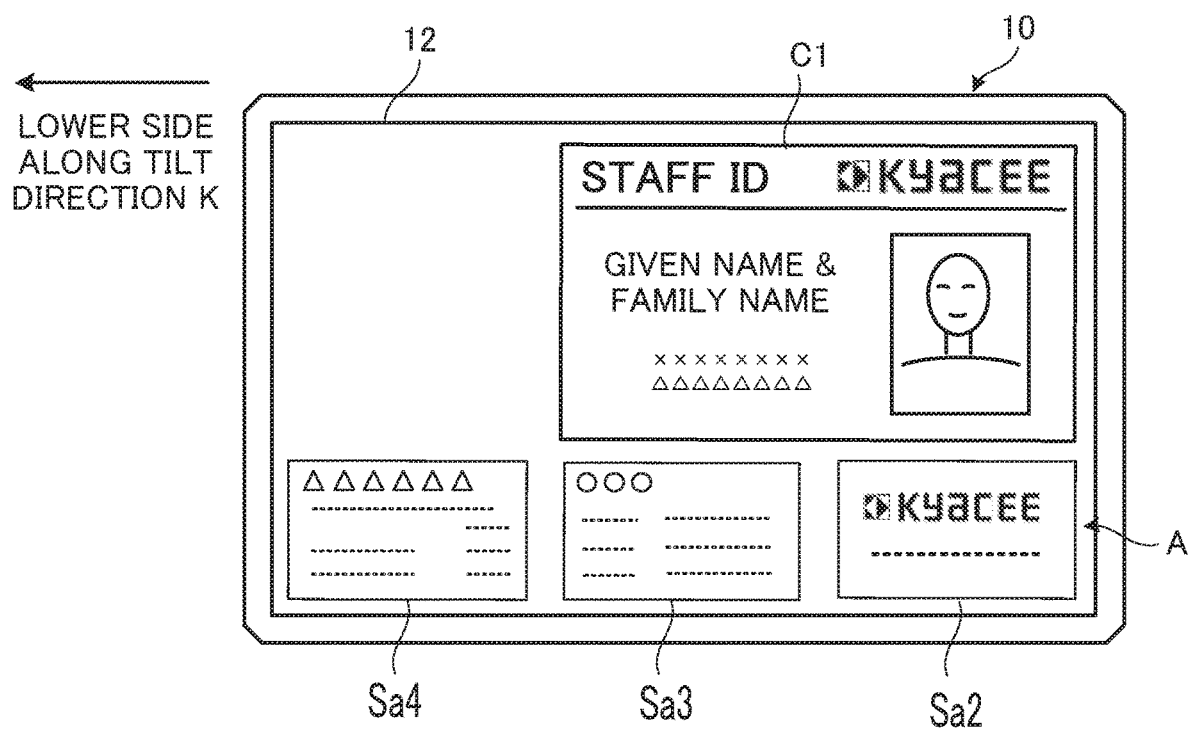

When it is decided that the instruction to switch the display of the content image and the sample images has been made, the controller 21 moves, according to the instruction, the sample images Sa2, Sa3, and Sa4 displayed on the screen of the display unit 12, from the higher side to the lower side along the tilt direction K of the screen detected as above. To be more detailed, the controller 21 erases the display of the sample image Sa2 by moving the sample images from the higher side to the lower side along the tilt direction K of the screen. Then the controller 21 reads out the sample image Sa1, next in the display order, from the storage unit 13, and displays the sample image Sa1 at the highest position along the tilt direction K, with the sample images Sa4 and Sa3 displayed next to the sample image Sa1, from the higher side, as shown in FIG. 7B and FIG. 7C. Further, upon erasing the display of the sample image Sat at the lowest position along the tilt direction K of the screen of the display unit 12, the controller 21 causes the display unit 12 to display the content image C2, corresponding to the sample image Sa2, in the region of the screen of the display unit 12 other than the region A (step S109). Then the operation returns to step S106.

In the case where the user still keeps the information processing apparatus 10 tilted about the Y-axis of the screen of the display unit 12, so that the tilt angle α and the tilt direction K detected by the displacement detector 22 are maintained (No at step S106, Yes at step S107), the instruction identified by the instruction identifier 23 remains unchanged from the switching of the display of the sample images (step S108). Accordingly, the controller 21 erases the display of the sample image Sa4 at the lowest position along the tilt direction K of the screen. Then the controller 21 reads out the sample image Sa3, next in the display order, from the storage unit 13, and displays the sample image Sa3 at the highest position along the tilt direction K, with the sample images Sat and Sa1 displayed next to the sample image Sa3, from the higher side, for example as shown in FIG. 7D and FIG. 7E. Further, upon erasing the display of the sample image Sa4 at the lowest position along the tilt direction K of the screen of the display unit 12, the controller 21 causes the display unit 12 to display the content image C4, corresponding to the sample image Sa4, in the region of the screen of the display unit 12 other than the region A (step S109). Then the operation returns to step S106.

Thus, the predetermined number of sample images displayed on the screen of the display unit 12 are sequentially updated in the predetermined display order as shown in FIG. 7D and FIG. 7E, and the content image displayed on the screen is also updated.

Figure 7G:
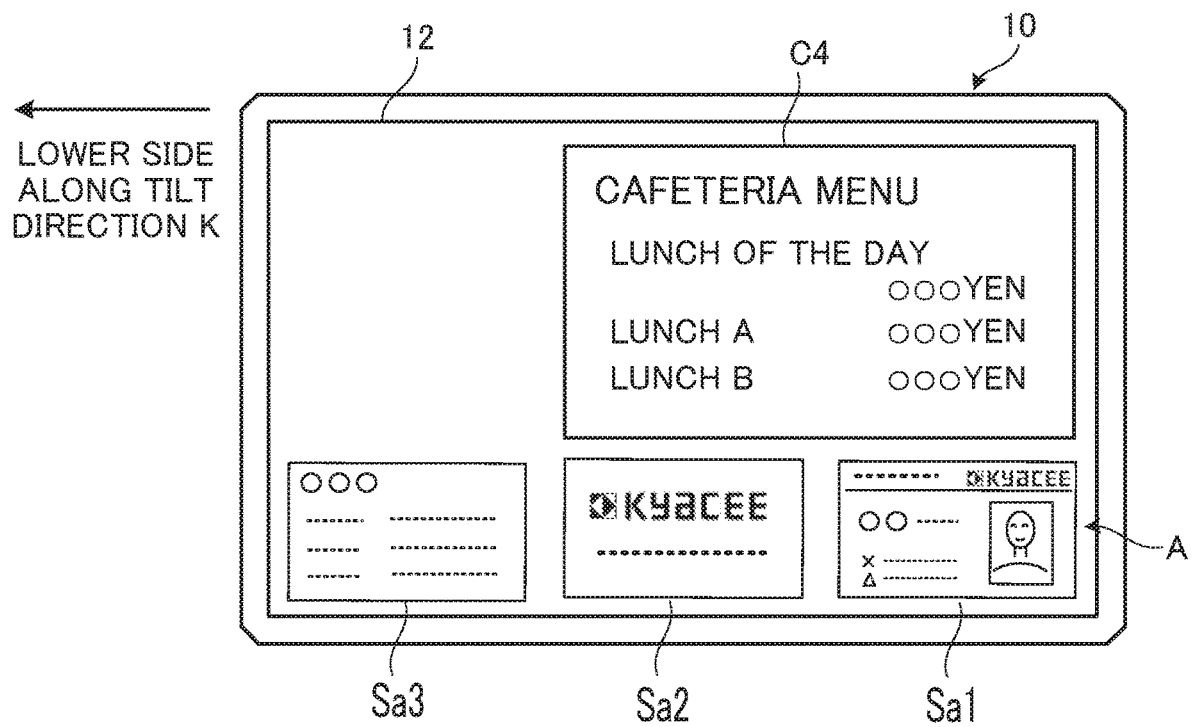

Likewise, when the screen of the display unit 12 is tilted in the reverse direction about the Y-axis, the controller 21 erases the sample image by moving the same on the screen of the display unit 12 in the direction opposite to the forward direction (to the lower side along the tilt direction K). Then the controller 21 reads out the next sample image from the storage unit 13 in the reverse display order, and displays the sample image thus read out so as to appear from the higher side toward the lower side of the screen. Further, upon erasing the display of the sample image at the lowest position along the tilt direction K of the screen, the controller 21 causes the display unit 12 to display the content image corresponding to the sample image that has been erased, on the screen, as shown in FIG. 7 and FIG. 7G.

Thus, the predetermined number of sample images displayed on the screen of the display unit 12 are sequentially updated in the same display order as that of the content images. Therefore, the user can easily predict the content image to be displayed next, after the content image currently displayed on the screen.

When the user resets the screen of the display unit 12 of the information processing apparatus 10 to the generally horizontal posture, the tilt angle α about the Y-axis of the screen, detected by the displacement detector 22, becomes equal to or lower than the predetermined value (No at step S107). Therefore, the instruction identifier 23 decides that the user has instructed to stop switching the display of the sample images (step S110).

When it is decided that the instruction to stop switching the display of the sample images has been made, the controller 21 stops, according to the instruction, moving the sample images on the screen of the display unit 12, and maintains the current display of the content image (step S111). Then the operation returns to step S106.

At step S106, when the user swings the information processing apparatus 10 downward, so that the displacement detector 22 detects the downward displacement of the information processing apparatus 10 (Yes at step S106), the instruction identifier 23 decides, on the basis of the downward displacement, that the user has instructed to display only the content image (step S112).

When it is decided that the instruction to display only the content image has been made, the controller 21 returns to step S101 according to the instruction, and erases the sample images thus far displayed on the screen of the display unit 12, and leaves only the content image displayed over the entire region of the screen of the display unit 12.

Here, when the display of a page is switched according to the tilt direction in an existing display system, the page to be displayed next is unable to be predicted, and therefore it is difficult to retrieve the desired page and have that page displayed on the screen.

With the arrangement according to this embodiment, in contrast, the display can be switched among different content images and sample images, simply by holding the information processing apparatus 10 and moving the same upward or downward, and maintaining the screen of the display unit 12 in the generally horizontal posture or tilting the same. In addition, since the predetermined number of sample images displayed on the screen of the display unit 12 are sequentially updated in the same display order as that of the content images, the user can easily predict the content image to be displayed next, after the content image currently displayed on the screen. Consequently, when sequentially displaying the content images, the user can predict the content image to be displayed next, and easily obtain the display of the desired content image.

Figure 8A:
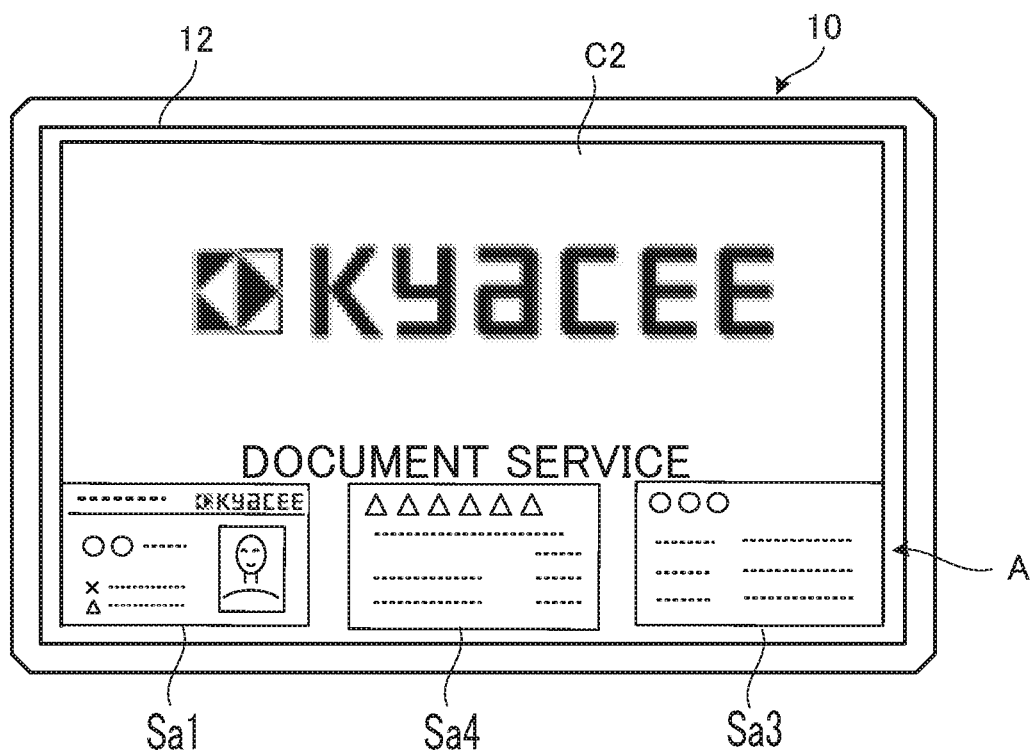
FIG. 8A and FIG. 8B are plan views showing another display mode of the screen of the display unit, in which the content image and a predetermined number of sample images are displayed.
Figure 8B:
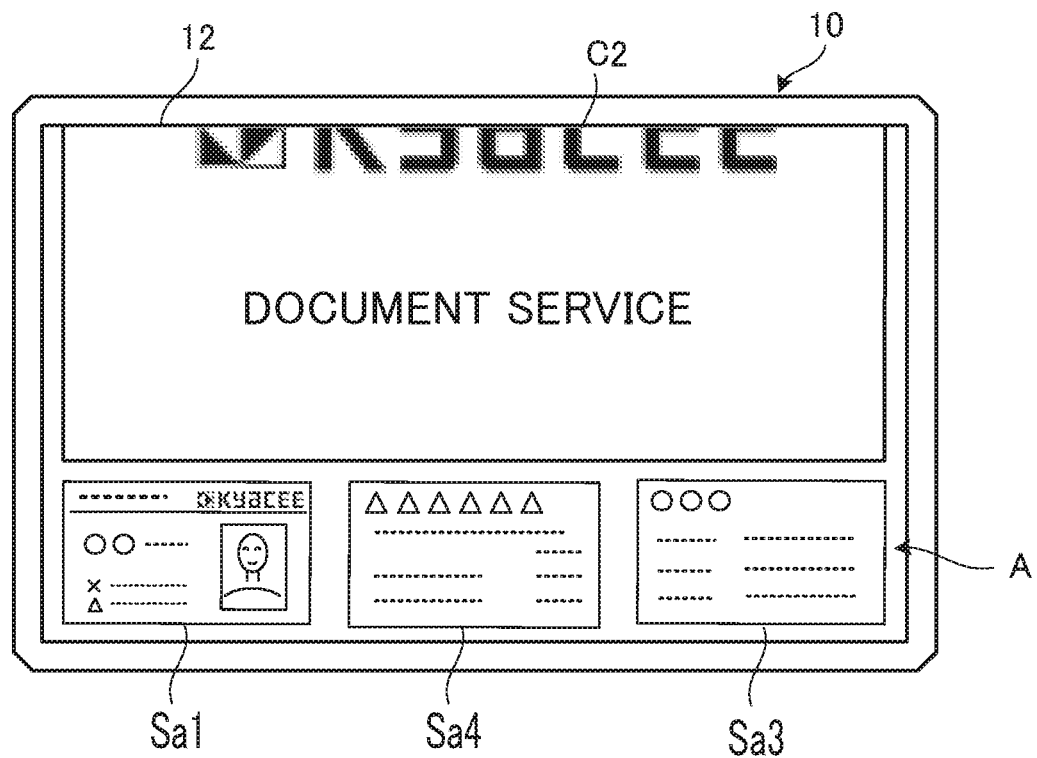

In the foregoing embodiment, the content image is reduced on the screen of the display unit 12, and the reduced content image is moved upward to thereby create a vacant space in the lower region of the screen, and display the predetermined number of sample images in the vacant space. Alternatively, as shown in FIG. 8A, the predetermined number of sample images may be displayed so as to overlap the display of the content image, in a part of the screen of the display unit 12. Otherwise, as shown in FIG. 8B, the display of the content image may be shifted upward, so as to erase an upper portion of the content image, and the predetermined number of sample images may be displayed in a vacant space created in the lower region of the screen by shifting the content image upward screen. Further, the vacant space may be created in the upper region of the screen, to display the predetermined number of sample images in such vacant space.

Figure 9:
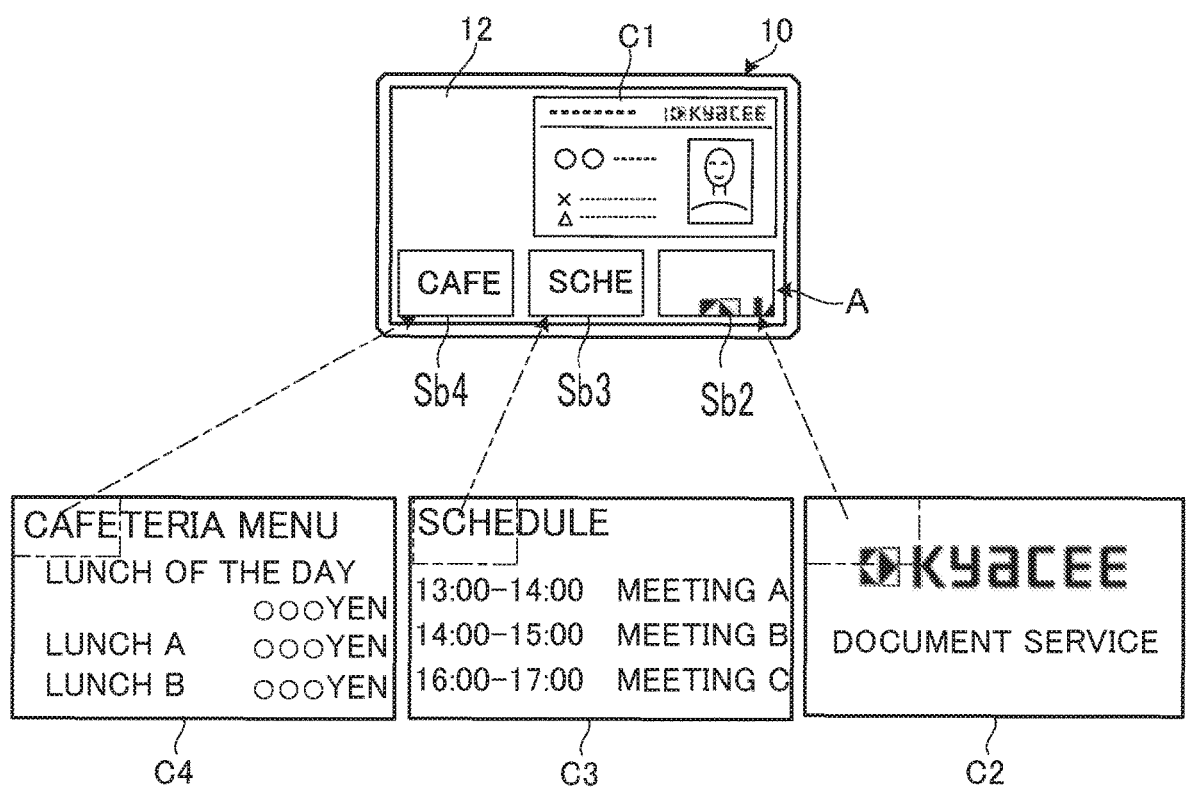
FIG. 9 is a plan view showing other types of sample images displayed on the screen of the display unit.

Referring now to FIG. 5, the controller 21 may perform an image processing to crop an upper left corner portion of each of the content images C1 to C4, and store the respective cropped images as sample images Sb1 to Sb4. Then as shown in FIG. 9, a predetermined number of sample images out of the sample images Sb1 to Sb4 may be displayed in the region A of the screen of the display unit 12. Without limitation to the upper left corner portion of the content image, a different portion of the content image may be cropped, to create the sample images.

Figure 10:
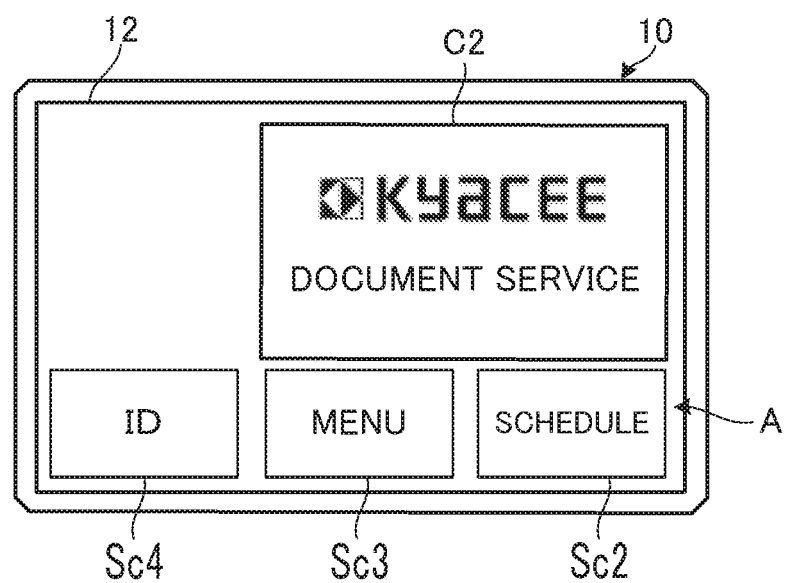
FIG. 10 is a plan view showing still other types of sample images displayed on the screen of the display unit.

Referring again to FIG. 5, the controller 21 may generate images respectively including the header information of the content images C1 to C4, as sample images Sc1 to Sc4, and a predetermined number of sample images out of the sample images Sc1 to Sc4 may be displayed in the region A of the screen of the display unit 12, as shown in FIG. 10.

In the foregoing embodiment, the sample images are displayed on the screen of the display unit 12 when the user swings the information processing apparatus 10 upward, and the sample images are erased 2 when the user swings the information processing apparatus 10 downward. Alternatively, however, the controller 21 may display or erase the sample images according to a different operation performed by the user on the information processing apparatus 10. For example, the controller 21 may display the sample images, when the user rotates the information processing apparatus 10 about the X-axis of the screen of the display unit 12 in a predetermined direction, so that the instruction identifier 23 accordingly decides that the user has instructed to display the sample image, and erase the sample images, when the user rotates the information processing apparatus 10 about the X-axis of the screen of the display unit 12 in the direction opposite to the predetermined direction, so that the instruction identifier 23 accordingly decides that the user has instructed to erase the sample image.

In the foregoing embodiment, likewise, the controller 21 updates the sample images by moving them on the screen of the display unit 12, when the user tilts the information processing apparatus 10 about the Y-axis of the screen of the display unit 12. Instead, however, the controller 21 may update the sample images one by one by moving the sample images in the direction in which the user has swung, each time the user swings the information processing apparatus 10 to the left or to the right, so that the instruction identifier 23 accordingly decides that the user has instructed to display the sample image.

Further, an operation key to instruct to display or erase the sample image, and an operation key to instruct to move or update the sample image may be provided on the information processing apparatus 10, so that (i) each time the instruction to display the sample image is inputted by a press of the operation key, the controller 21 may display the sample image; (ii) each time the instruction to erase the sample image is inputted by a press of the operation key, the controller 21 may erase the display of the sample image; (iii) each time the instruction to move the sample image is inputted by a press of the operation key, the controller 21 may move the display position of the sample image; or (iv) each time the instruction to update the display of the sample image is inputted by a press of the operation key, the controller 21 may update the display of the sample image.

Further, the information processing apparatus according to the disclosure is applicable to different types of portable devices, without limitation to the IC card.

The configurations according to the foregoing embodiment, described with reference to FIG. 1 to FIG. 10, are merely exemplary, and in no way intended to limit the disclosure to those configurations.

While the present disclosure has been described in detail with reference to the embodiments thereof, it would be apparent to those skilled in the art the various changes and modifications may be made therein within the scope defined by the appended claims.

What is claimed is:
1. An information processing apparatus comprising:
   a display unit;
   a storage unit that stores a plurality of content images to be displayed on a screen of the display unit in a predetermined display order and a plurality of sample images respectively corresponding to the plurality of content images and smaller in size than the content images; and
   a control unit including a processor and configured to act, when the processor executes a control program, as:
      an instruction identifier that identifies, when a user operates the display unit, a type of an instruction corresponding to an operation, and
      a controller that (i) acquires the content image from the storage unit and causes the display unit to display the content image on the screen and (ii) acquires from the storage unit, when the instruction identifier decides that an instruction to display the sample image has been made, a predetermined number of sample images respectively corresponding to a predetermined number of content images subsequent in the display order to the content image currently displayed on the screen and causes the display unit to display the predetermined number of sample images on a part of the screen,
   wherein, when the instruction identifier decides that an instruction to switch the display of the sample image has been made, the controller erases the sample image first in the display order out of the predetermined number of sample images displayed on the screen, acquires another sample image next to the predetermined number of sample images in the display order from the storage unit, and causes the display unit to display the acquired sample image on the screen, and upon erasing the sample image first in the display order out of the predetermined number of sample images displayed on the screen, the controller causes the display unit to display the content image corresponding to the erased sample image in a region of the screen other than the part of the screen.

2. The information processing apparatus according to claim 1,
wherein the controller causes the display unit to display the predetermined number of sample images so as to overlap the content image displayed on the screen.

3. The information processing apparatus according to claim 1,
wherein the controller moves a position of the content image displayed on the screen and causes the display unit to display the predetermined number of sample images in a vacant space created by the moving.

4. The information processing apparatus according to claim 1,
wherein the controller reduces the content image displayed on the screen and causes the display unit to display an entirety of the reduced content image in a region of the screen other than the part of the screen.

5. The information processing apparatus according to claim 1,
wherein the sample image is one of a reduced image of the content image corresponding to the sample image, a part of the content image cropped from the content image corresponding to the sample image, and an image including header information of the content image corresponding to the sample image.

6. The information processing apparatus according to claim 5,
wherein the controller generates the sample image from the content image.

7. The information processing apparatus according to claim 1, further comprising a sensor that detects displacement of the display unit when the user performs an operation to displace the display unit,
wherein the control unit further acts as a displacement detector that detects a displacement direction of the display unit on a basis of a detection signal outputted from the sensor, and
the instruction identifier identifies the type of the instruction on a basis of the displacement direction detected by the displacement detector.

8. The information processing apparatus according to claim 1,
wherein, when the instruction identifier decides that an instruction to display only the content image has been made, the controller erases the predetermined number of the sample images displayed on the screen of the display unit and leaves only the content image displayed on the screen of the display unit.

9. The information processing apparatus according to claim 1,
wherein, when the instruction identifier decides an instruction to stop switching the display of the sample images, the controller restricts the display unit from erasing the sample image first in the display order and from displaying the sample image next to the predetermined number of sample images in the display order and maintains the current display of the content image.

* * * * *